United States Patent [19]

Romageon

[11] 4,187,337
[45] Feb. 5, 1980

[54] ANTI-SLIP UNDERLAY

[76] Inventor: Roland H. Romageon, 165 boulevard Bineau, Neuilly sur Seine, France

[21] Appl. No.: 865,249

[22] Filed: Dec. 28, 1977

[30] Foreign Application Priority Data

Jan. 6, 1977 [FR] France ................. 77 0023

[51] Int. Cl.² ............................................. B32B 5/06
[52] U.S. Cl. ...................... 428/95; 428/218; 428/234; 428/300; 428/310
[58] Field of Search ............ 428/91, 95, 218, 234, 428/300, 310

[56] References Cited

U.S. PATENT DOCUMENTS

| | | | |
|---|---|---|---|
| 2,563,478 | 8/1951 | Mason | 428/91 |
| 3,441,464 | 4/1969 | Blue | 428/95 |
| 3,975,562 | 8/1976 | Madebach | 428/95 |

FOREIGN PATENT DOCUMENTS 886042 1/1962 United Kingdom .
1248582 10/1971 United Kingdom .

*Primary Examiner*—Marion E. McCamish
*Attorney, Agent, or Firm*—Armstrong, Nikaido, Marmelstein & Kubovcik

[57] ABSTRACT

An underlay with antislip properties is disclosed in which there are three layers, one being a resilient layer of foam material or rubber, to which is attached the second layer which is of interlocked fibrous material; the third layer is a looser fibrous layer and is connected by interlocking with the fibres of the second layer. When the underlay is used between a rug and a carpet the first layer is placed against the underneath of the rug, while the third layer interacts with the topside of the carpet. When the underlay is used between a carpet (or rug) and a floor, the first layer is placed against the underneath of the carpet.

3 Claims, 1 Drawing Figure

U.S. Patent     Feb. 5, 1980     4,187,337
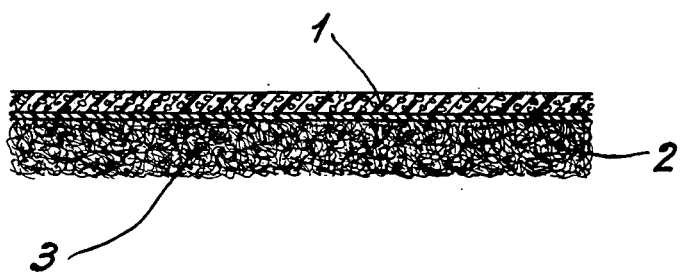

ANTI-SLIP UNDERLAY

BACKGROUND OF THE INVENTION

1. Field of the Invention

The present invention relates to an antislip underlay for floor coverings, particularly intended to prevent the deformation of rugs, e.g. load-bearing rugs laid over carpets, and also relates to rugs or carpets having such an underlay.

2. Description of the Prior Art

It is known that when rugs are laid on certain floor surfaces, for example carpets, marble floors, tiles, waxed parquet floors, the rugs tend to slip when trodden on and to crease or roll up, which not only damages them but may also cause falls or other accidents. When relatively heavy pieces of furniture, such as tables or occupied chairs, are placed on a rug laid on a carpet, the feet of the pieces of furniture transmit to the rug concentrated forces which limit the displaceability of the rug in relation to the carpet. When subjected to intermittent stresses, a rug tends to be displaced on the carpet in the direction in which the pile of the latter lies down when crushed, thus giving rise to slow creeping of the rug. These two effects have the consequence that a load-bearing rug which has been walked on or trodden on has bulges or undulations which have a very disadvantageous effect both from the aesthetic point of view and from the point of view of wear.

It has already been proposed to obviate these disadvantages by sewing the rug to the carpet, but this has many other disadvantages.

In order to prevent the deformation of load-bearing rugs laid on a carpet, it is also known to place between the rug and the carpet a relatively rigid sheet of material (for example of cardboard) whose two faces are rough, or of which one face is smooth while the other is rough.

It is known to have an underlay as an integral part of and permanently bonded to, a carpet; see for example U.S. Pat. No. 3,441,464 which describes a complex carpet structure formed in a multiplicity of steps from five components. The necessity of having the topside of the underlay able to cooperatively interact with the underneath of the carpet does not arise, since they are heat bonded to each other.

It is also known to have laminates of fibrous materials and resilient material as underlay (e.g. U.K. patent specifications Nos. 886,042 and 1,248,582) in which the fibrous material has been employed for strengthening the laminate. The fibre is needled to the cellular material so that fibres enter or pass through the cellular material.

U.S. Pat. No. 3,686,046 describes a carpet which in fact has a structure similar to that of the underlays described in the above mentioned U.K. patents.

French patent specification No. 1,262,737 describes a process of making a fabric (not a carpet) by needling a body of fibres into a cellular layer so that fibres project through the layer, and then needling these projecting fibres from the other side of the composite. A three-layer structure is produced with the cellular layer in the middle.

SUMMARY OF THE INVENTION

The present invention has as an object a material which makes it possible to prevent load-bearing rugs, that is to say rugs subject to the pressure of furniture such as wardrobes, tables, or chairs, when laid on a carpet, from being deformed and curling up as a result of being walked on. It has, as another object, the provision of underlay for the prevention of slipping and creeping of rugs when laid on carpets. A further object is an improved material as an underlay for carpets.

The present invention provides an antislip material comprising a layer of resilient material, characterized in that this layer of material is joined to a layer of fibres interlocked with one another, and connected by interlocking to this layer of fibres is a second layer of fibres, which has a lower density than the first layer of fibres.

The basic principle of the invention consists in adapting each of the faces of the sheet to the surface with which it is to come into contact. Thus, the face cooperating with the back of the rug is advantageously the face of the resilient material, whereas the lower density fibre face bears against the carpet. The fibres projecting from the lower face penetrate into and interengage with the pile of the carpet, thus immobilizing the flexible sheet inserted between the carpet and the rug. Since in addition the rug is immobilised by the resilient material, the problem of the slipping of the rug is solved. Contrary to what already exists, the sheet thus constructed is flexible and is able to be cut so as to be completely hidden by the rug. The rug is simply laid on the flexible sheet and is not deformed, even after being walked on for several hours.

The sheet can also be used in the manner of a normal underlay, with the fibrous side of the sheet placed uppermost to interact with the underneath of the carpet, and the resilient material being placed against the floor.

BRIEF DESCRIPTION OF THE DRAWINGS

A particular non-limitative and preferred embodiment of the invention will now be described with reference to the accompanying drawing, wherein: the FIGURE shows a sectional view of the preferred underlay embodying the present invention.

DESCRIPTION OF THE PREFERRED EMBODIMENT

In this FIGURE it can be seen that the material is laminated, the first layer 1 being a layer of resilient material for example polyester foam intended to cooperate with the back of the rug or alternatively the floor, if the material is being used as underlay. The layer 2 is advantageously composed of non-woven polyester fibres. In the example illustrated the layer 3 is composed of fibres of the same material as the layer 2 but at a lower density than layer 2, these fibres being interlocked with and projecting from the layer 2 in such a manner as to make the bottom surface rough. This material may be obtained in various ways. The preferred method is by needle-felting part of the thickness of a sheet of non-woven material to form the compacted layer 2, after which the layer of polyester foam is joined by foaming or hot bonding to the needle-felted side of the sheet. Thus in the needle-felted portion 2, the fibres are more interlocked with one another and the density is higher, than in the portion 3 which is not needle-felted.

Although in the above example the materials used are synthetic materials, it is possible to replace the layer 1 of polyester foam by a layer of rubber and to replace the nonwoven material of layers 2 and 3 by brushed cotton or brushed wool wherein the woven part of the material constitutes layer 2 and the brushed up pile is layer 3. The total thickness of the sheet is typically about 7 to 8 mm when using nonwoven material, of which thickness the foam occupies a height of about 2.5 mm. Taking into account the crushing of the different layers and the penetration of the fibres into the carpet, the interposition of the sheet is practically unnoticeable and the actual rug retains flexibility at least equivalent to that which it had before interposition of the sheet.

Although the description given above is limited to the problem of the slipping of rugs on carpets, it is also possible to use the illustrated material on smooth floors, provided of course that the layer 1 of resilient material is laid against the floor, the fibres emerging on the opposite side being able to cooperate with the back of the rug or the carpet.

It is obvious that modifications may be made to the embodiment described above, particularly by substituting equivalent materials and methods, without thereby departing from the spirit and scope of the present invention, and it is intended to cover all such modifications in the following claims.

I claim:

1. An underlay for carpets, rugs and the like, comprising:
    a first layer which is of resilient material selected from the group comprising resilient synthetic foam material and rubber;
    a second layer of non-woven fibrous material which is secured to one face of said first layer without substantial penetration of its fibers into said first layer; and
    a third layer of non-woven fibrous material which is connected by inerlocking with the fibers of said second layer, said second layer of non-woven fibrous material being needle-felted to cause compaction and interlocking of the fibers of said second layer thereby causing said second layer to have a density greater than the third layer;
    whereby the outer face of the first layer provides a non-skid surface and an outer face of the third layer provides a relatively rought, fibrous surface.

2. A first carpet, rug or like floor-covering which is laid upon a second carpet, rug or like floor-covering with the interposition therebetween of an underlay according to claim 1 wherein the outer face of the first layer of the underlay contacts the underside of the first floor-covering and the outer face of the third layer contacts the second floor-covering.

3. A carpet, rug or the like floor-covering which is separated from a hard floor by means of an underlay according to claim 1, wherein the outer face of said first layer of the underlay contacts the floor and the outer face of said third layer contacts the underface of the floor-covering.

* * * * *